United States Patent

Westerhuis et al.

[11] 3,955,806
[45] May 11, 1976

[54] VESSEL WITH REFRACTORY LINING AND COVER ASSEMBLY THEREFOR

[75] Inventors: Karl Westerhuis, Orsoy; Günther Hahn, Duisburg, both of Germany

[73] Assignee: Demag Aktiengesellschaft, Duisburg, Germany

[22] Filed: May 29, 1975

[21] Appl. No.: 581,748

[30] Foreign Application Priority Data
May 31, 1974 Germany............................ 2426358

[52] U.S. Cl. ............................................. 266/275
[51] Int. Cl.² ............................................ F27D 15/00
[58] Field of Search................. 266/34 V, 39, 43; 220/315, 323, 324, 326

[56] References Cited
UNITED STATES PATENTS

| | | |
|---|---|---|
| 3,149,959 | 9/1964 | Nicholson............................. 266/39 |
| 3,721,363 | 3/1973 | Bressler et al. ..................... 220/315 |
| 3,764,124 | 10/1973 | LeMoyne............................. 266/34 V |

FOREIGN PATENTS OR APPLICATIONS
449,739  7/1936  United Kingdom................... 266/39

Primary Examiner—Gerald A. Dost
Attorney, Agent, or Firm—Toren, McGeady and Stanger

[57] ABSTRACT

A vessel particularly suitable for shipping liquid metals such as pig iron is provided with a cover which has a cross-sectional configuration in the shape of a compound curve, with an annular extension wall of the cover extending in overlapping relationship about the body of the vessel. The cover comprises a circumferentially extending inwardly protruding packing strip which is arranged to bear against the upper edge of the vessel with a packing member being interposed between the vessel edge and the packing strip. Connecting means extending between the vessel body and the cover include means for receiving fastening wedges which hold the cover on the vessel, with the fastening wedges extending tangentially of the vessel body.

7 Claims, 4 Drawing Figures

VESSEL WITH REFRACTORY LINING AND COVER ASSEMBLY THEREFOR

BACKGROUND OF THE INVENTION

The present invention relates generally to vessels provided with a refractory lining which are particularly suitable for shipment of liquid metals such as pig iron and which are provided with detachable cover means including fastening elements distributed about the periphery of the vessel.

Vessels of the type to which the present invention relates are normally used for pig iron mixers wherein a cylindrical shell has an annular flange at one or both ends upon which there is secured by means of screws or other similar devices a cover or bottom member. However, such conventional screw joints for fastening covers to such vessels involve a disadvantage in that they are difficult to loosen and detach if the threads become damaged or inoperative. Furthermore, manufacturing requirements of high precision are involved due to the necessity for enabling the covers to be interchanged. If flange holes and other connecting members are not accurately located relative to each other, disconnection and replacement of cover members can involve substantial difficulty. The precision with which flange holes and other connecting devices can be made to coincide during assembly and use of the devices encounters obstacles due to the fact that when the vessel is in use unavoidable heat factors cause misalignments to occur thereby rendering assembly and disassembly more difficult.

The present invention is aimed at overcoming problems involved in the aforementioned type of vessels and toward avoiding many of the difficulties which might arise when cover members are to be quickly attached and detached, for example, during relining of the vessel. The invention is intended to provide an improved vessel construction of the aforementioned type wherein many of the problems encountered with prior art structures may be obviated or significantly alleviated.

SUMMARY OF THE INVENTION

Briefly, the present invention may be described as a vessel assembly, particularly of the type suitable for storing or transporting liquid metals, wherein a cover member is provided with a cross section which is curved in the form of a compound curve. The cover member is provided at its edge with a cylindrical or annular extension which overlaps the end of the cylindrical vessel or shell and extends about the outer periphery thereof. An inwardly protruding circumferential packing strip is arranged on the inner side of the annular extension of the cover with the packing strip being located to bear against the end face of the vessel shell which is designed as a packing counter surface. Furthermore, means are provided for attaching and holding the cover over the open end of the vessel shell, said attachment or connection means being designed to receive therethrough fastening wedges which may be introduced in a direction tangentially of the body of the vessel shell.

In a preferred embodiment of the invention, the means for receiving the fastening wedges consist of a pair of links arranged in juxtaposed space condition either on the cover or the shell and having aligned openings for receiving the fastening wedges. On the other part of the assembly, i.e., either the cover or the vessel shell, a single link extending between the aforementioned pair of links is provided with a similar opening for receiving the fastening wedge. The pair of links extend to overlap the cylindrical or annular extension of the cover member on the outer side thereof and there is provided spacing between the pair of links and the body of the vessel shell to enable the cover member to be introduced therebetween.

By further aspect of the invention, the means for receiving the fastening wedges may be arranged as equidistant links, with one link being provided on each of the cover member and vessel body, and each having aligned openings through which a fastening wedge may be introduced. A connecting link is attached to one of the aligned links in a manner which enables the connecting link to be moved in a direction radially of the vessel. Radial movement of the connecting link enables the other end of the link to be brought into alignment with the other aligned link and by means of a fastening wedge, the connecting link may be attached to the other aligned link thereby securing the cover upon the vessel.

The various features of novelty which characterize the invention are pointed out with particularity in the claims annexed to and forming a part of the disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE PREFERRED EMBODIMENT

Figure 1:
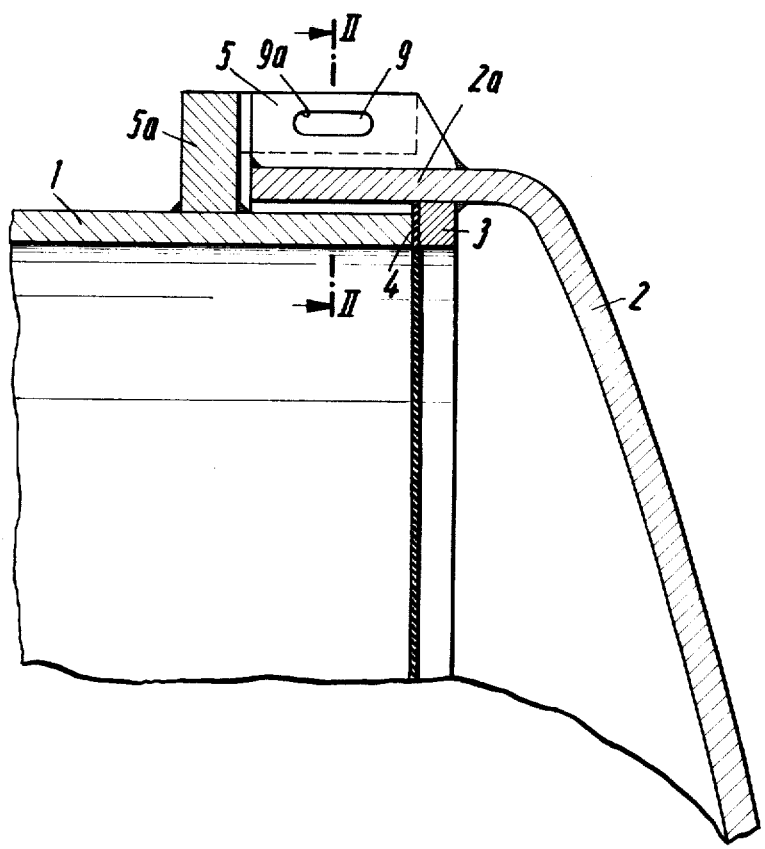
FIG. 1 is a partial sectional view showing a portion of a vessel assembly embodying the present invention.
Figure 2:
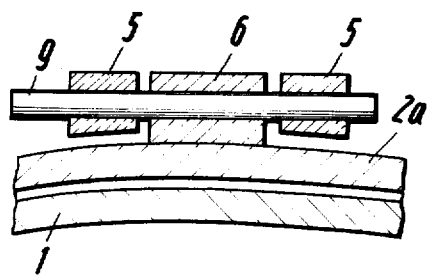
FIG. 2 is a sectional view taken along the line II-II of FIG. 1.
Figure 3:
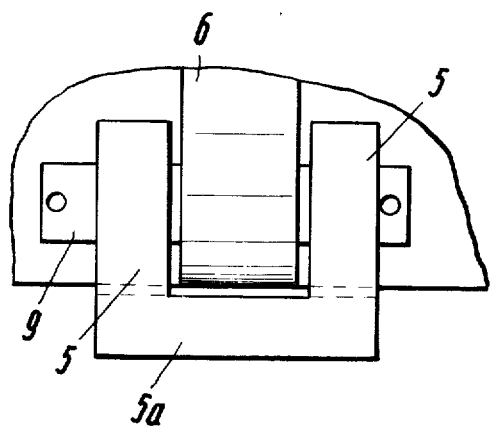
FIG. 3 is a top view of the fastening means shown in FIG. 1.

Referring now to the drawings, and more particularly to FIGS. 1-3, there is shown a part of a vessel having a refractory lining wherein the present invention is particularly embodied. The portion of the assembly depicted in FIG. 1 includes a cylindrical vessel 1 adapted to receive liquid metal, particularly pig iron, which has a forward open end which is closed by a cover member 2. The cover member 2 is formed to comprise a cross section shaped in a compound curve. Provided about the outer periphery of the cover 2 is an annularly shaped cylindrical extension 2a which overlaps the outer side of the cylindrical vessel or shell 1 in the vicinity of its forward open end. On the inner side of the cylindrical extension 2a there is arranged on the cover 2 a circumferentially inwardly extending packing strip 3 which is positioned to bear upon a packing member 4 which is interposed between the forward edge of the vessel 1 and the packing strip 3.

The cover member 2 is detachably affixed upon the forward end of the vessel 1 by connecting means which include a pair of radially projecting links 5 secured in a juxtaposed paired arrangement on the outer side of the vessel shell 1 with a spacing being provided therebetween.

The links 5 are secured upon a bracket 5a from which they project in a forked arrangement with a space being provided between the links 5 and the outer side of the vessel 1 wherein there is received the cylindrical extension 2a of the cover 2. The links 5 are provided with aligned openings 9a adapted to receive therethrough a fastening wedge 9.

On the outer side of the cylindrical extension 2a of the cover 2 there is secured a single link 6 which is positioned to be introduced between the links 5 and which is likewise equipped with an opening through which a fastening wedge 9 may be placed.

The links 5 and 6 include openings 9a having a shape or configuration adapted to coincide with the shape and configuration of the wedge 9 whereby, when the cover is placed over the vessel 1 with the link 6 extending between the links 5, the wedge 9 may be passed through the openings 9a in order to firmly press the cover upon the vessel 1 with the packing strip 3 bearing against the packing member 4 and the forward edge of the vessel 1. With the elements in this position, the wedge 9 may be tightened after attachment of the cover.

Figure 4:
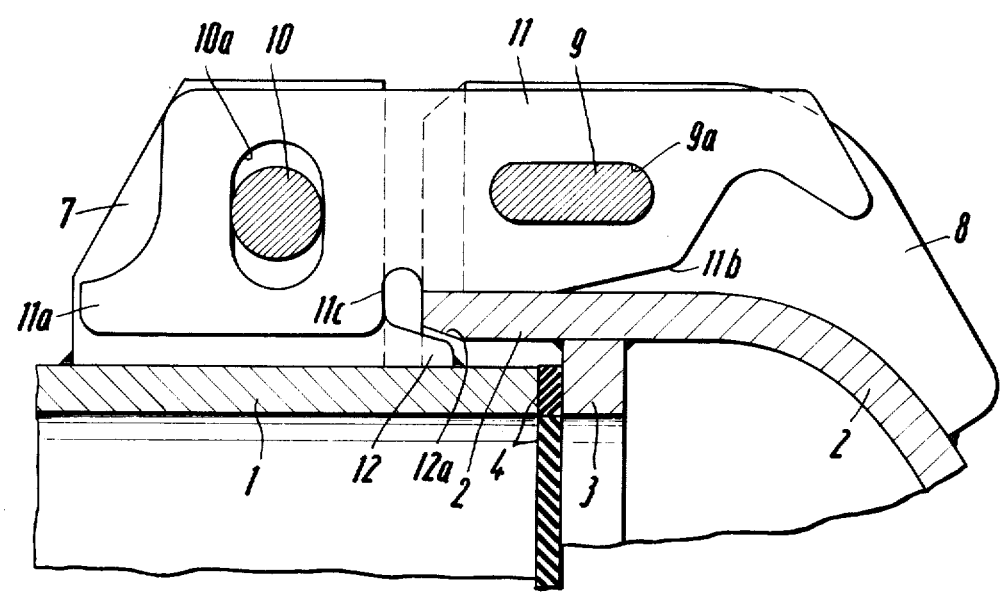
FIG. 4 is a partial sectional view depicting another embodiment of the invention.

A modified embodiment of the present invention is shown in FIG. 4. In the embodiment of FIG. 4, a pair of links 7 and 8 are secured one on the vessel shell 1 and the other on the cylindrical extension 2a of the cover 2 with a space being provided between the links 7 and 8. The links arranged in pairs do not interlock as in the embodiment previously described, but instead are arranged in an opposed position with their ends spaced apart a short distance when the cover 2 is in the attached position. The links are arranged in pairs and they are provided to receive a connecting link 11 between them. To this end, the links secured on the vessel shell are provided with transverse bores or oblong slots 10a through which a bolt 10 is received. The oblong slot 10a is provided at the container edge of the link 11 with its longer axis side extending radially relative to the container 1.

The links 8 secured on the cover 2 comprise aligned openings 9a adapted to receive the wedge 9. In a corresponding manner, the connecting link 11 is likewise provided with an opening 9a adapted to receive the wedge 9 in the range of its end on the cover side.

In order to insure that the cover 2 is centered when it is attached on the edge of the vessel 1, the link 7 affixed to the shell 1 are provided with bevelled noses 12 which project in the direction of the cover 2. Preferably, the edge of the cylindrical extension 2a is also provided at 12a with a bevel on the inside thereof.

The oblong slot provided in the connecting link 11 serves to adjust the fastening means when the cover is displaced by the action of heat. The connecting link comprises a nose 11a at its end on the vessel side thereof which insures that the inclined position which the connecting link undertakes when the cover is attached is limited. The connecting link 11 forms on its underside a shoulder 11c in order to provide a gap which will remain between the receding part of the bottom edge of the link to the right of the shoulder 11c as seen in FIG. 4 and the outside of the vessel 1. The cover can be easily introduced into this gap during assembly. This gap is widened in the direction of introduction of the cover because of the fact that the bottom surface of the connecting link 11 forms a bevelled configuration shown at 11b.

While specific embodiments of the invention have been shown and described in detail to illustrate the application of the inventive principles, it will be understood that the invention may be embodied otherwise without departing from such principles.

What is claimed is:

1. A generally cylindrical vessel having a refractory lining and particularly suitable for shipping liquid metals comprising:
    a vessel body having a side wall with a terminal edge defining an open end of said vessel body;
    a cover for said open end, said cover comprising:
        a cross-sectional configuration in the shape of a compound curve,
        an annular extension wall extending about said side wall of said vessel body in overlapping relationship therewith, and
        a circumferentially extending inwardly protruding packing strip arranged about the inside of said annular extension wall and located to bear against said terminal edge of said vessel body about said open end thereof;
    a packing member interposed between said packing strip and said terminal edge; and
    connecting means extending between said vessel body and said cover for affixing said cover over said open end, said connecting means including fastening wedges and receiving means having said fastening wedges introduced therein with said wedges arranged to extend tangentially of said vessel body when within said receiving means.

2. A vessel according to claim 1 wherein said receiving means comprise a pair of spaced juxtaposed links each having an aligned opening for receiving therethrough said fastening wedges, and a single link having an opening for receiving therethrough said fastening wedges, said single link being arranged between said pair of links with said openings aligned to have a fastening wedge extend therethrough, said pair of links being both affixed to extend from one only of said cover or said vessel body with said single link being affixed to extend from the other.

3. A vessel according to claim 1 wherein said connecting means comprise a pair of aligned links, one affixed to said cover member and one affixed to said vessel body, a connecting link extending between said aligned links, and means mounting said connecting member to one of said aligned links in a manner enabling said connecting link to be moved radially of said vessel body into and out of connecting alignment with the other of said aligned links, said receiving means including means for mounting said fastening wedges in locking engagement through said connecting link and said other one of said aligned links.

4. An assembly according to claim 3 wherein said connecting link is provided at one end thereof with an oblong slot extending transversely therethrough with a bolt being provided extending through said slot for attaching said connecting link to said one aligned link.

5. A vessel according to claim 3 wherein said one link affixed to said vessel body includes a side facing said cover member with said facing side having thereon conical noses which extend beneath said annular extension wall of said cover member.

6. A vessel according to claim 4 wherein said connecting link comprises at an end thereof adjacent to said oblong slot an outwardly projecting nose adapted to limit the inclined position of said connecting link.

7. A vessel according to claim 3 wherein said connecting link is provided on an end thereof adjacent to said opening for receiving said fastening wedge and on an underside of said connecting link facing said cover, an inclined surface tapering toward said cover and away therefrom in order to facilitate insertion of said annular extension wall between said connecting link and said vessel body.

* * * * *